United States Patent
Brookes et al.

(10) Patent No.: US 9,400,853 B2
(45) Date of Patent: Jul. 26, 2016

(54) SYSTEM AND METHOD FOR IDENTIFYING UNDER-DEFINED GEOMETRIES DUE TO SINGULAR CONSTRAINT SCHEMES

(75) Inventors: Steven J. Brookes, Thetford (GB); Peter A. Knight, Cambridge (GB); Ian J. Morrison, Histon (GB)

(73) Assignee: Siemens Product Lifecycle Management Software Inc., Plano, TX (US)

( * ) Notice: Subject to any disclaimer, the term of this patent is extended or adjusted under 35 U.S.C. 154(b) by 1067 days.

(21) Appl. No.: 13/097,450

(22) Filed: Apr. 29, 2011

(65) Prior Publication Data

US 2011/0276315 A1    Nov. 10, 2011

Related U.S. Application Data

(60) Provisional application No. 61/331,455, filed on May 5, 2010.

(51) Int. Cl.
*G06F 17/50* (2006.01)

(52) U.S. Cl.
CPC ............ *G06F 17/50* (2013.01); *G06F 2217/06* (2013.01)

(58) Field of Classification Search
None
See application file for complete search history.

(56) References Cited

U.S. PATENT DOCUMENTS

| | | | |
|---|---|---|---|
| 5,410,496 A * | 4/1995 | Bolon et al. | 703/7 |
| 6,963,824 B1 * | 11/2005 | Davidson et al. | 703/2 |
| 7,283,136 B2 * | 10/2007 | Chartier et al. | 345/440 |
| 8,248,407 B2 * | 8/2012 | Deslandes | 345/420 |
| 2008/0316204 A1 | 12/2008 | Deslandes | |

FOREIGN PATENT DOCUMENTS

| | | |
|---|---|---|
| JP | 2000-137740 A | 5/2000 |
| JP | 2007-156536 A | 6/2007 |
| WO | WO 9412941 A1 | 6/1994 |

OTHER PUBLICATIONS

Xiaobo, Peng, et al. "Singularity Analysis of Geometric Constraint Systems" J. Comput. Sci. & Technol., vol. 17, No. 3, pp. 314-323 (2002).*
Lin, V.C., et al. "Variational Geometry in Computer-Aided Design" Computer Graphics, vol. 15, No. 3, pp. 171-177 (1981).*
PCT International Search Report dated Jul. 25, 2011 corresponding to PCT Application No. PCT/US2011/034972 filed May 3, 2011 (10 pages).
Chung, et al. In Computer-Aided Design, vol. 32, No. 5-6, May 1, 2000 (pp. 355-365); Magazine (12 pages).
Lin, et al. In Computer Graphics, vol. 15, No. 3, Aug. 1981 (pp. 171-177); Magazine (8 pages).

* cited by examiner

*Primary Examiner* — Kamini S Shah
*Assistant Examiner* — Jay B Hann

(57) ABSTRACT

Systems, methods, and computer program products for identifying under-defined geometries due to singular constraint schemes. A method includes receiving a CAD model having a plurality of geometries and determining the degrees of freedom for each of the geometries. The method includes identifying a number of constraints on each of the geometries and identifying any of the geometries that are under-defined and any of the geometries that are well-defined. The method includes identifying any of the under-defined geometries that are under-defined due to singular (UDS) and storing a UDS indicator for each of the geometries identified as UDS. The method can include identifying geometries computed from these UDS geometries (CFS) and storing a CFS indicator for each of the geometries identified as CFS.

15 Claims, 3 Drawing Sheets

US 9,400,853 B2

SYSTEM AND METHOD FOR IDENTIFYING UNDER-DEFINED GEOMETRIES DUE TO SINGULAR CONSTRAINT SCHEMES

CROSS-REFERENCE TO RELATED APPLICATION

This application claims the benefit of the filing date of U.S. Provisional Patent Application 61/331,455, filed May 5, 2010, which is hereby incorporated by reference.

TECHNICAL FIELD

The present disclosure is directed, in general, to systems and methods for use in computer-aided design, manufacturing, using, modeling, and visualization (individually and collectively, "CAD" and "CAD systems") and in product lifecycle management ("PLM") and other systems.

BACKGROUND OF THE DISCLOSURE

Many manufactured products are first designed and modeled in CAD systems, and PLM systems are used by manufacturers, retailers, customer, and other users to manage the design, use, and disposal of various products. Improved systems are desirable.

SUMMARY OF THE DISCLOSURE

Various embodiments include systems, methods, and computer program products for identifying under-defined geometries, including those due to singular constraint schemes. A method includes receiving a CAD model having a plurality of geometries and determining a degree of freedom for each of the geometries. The method includes identifying a number of constraints on each of the geometries and identifying any of the geometries that are under-defined and those that are well-defined. The method includes identifying any of the under-defined geometries that are under-defined due to singular (UDS) and storing a UDS indicator for each of the geometries identified as UDS. The method can include storing an indicator for any geometries or variables that are directly or indirectly computed from these singular geometries ("computed from singular" or CFS).

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

Figure 1:
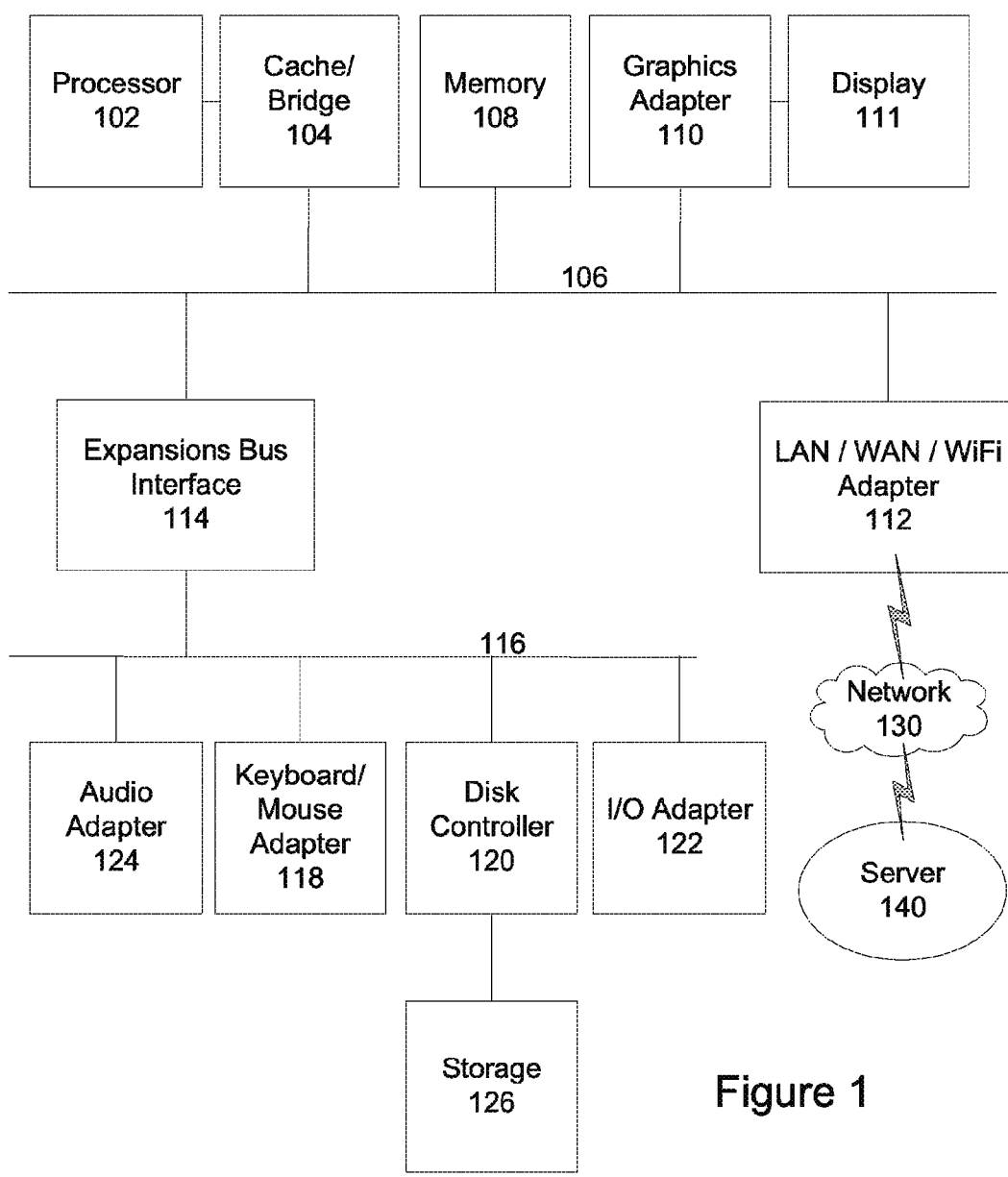
FIG. 1 depicts a data processing system in accordance with disclosed embodiments.

The figures discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Definitions: Following are short definitions of the usual meanings of some of the technical terms which are used in the present application. (However, those of ordinary skill will recognize whether the context requires a different meaning.) Additional definitions can be found in the standard technical dictionaries and journals.

As used herein, a "geometry" refers to a basic component of a model (e.g. point, line, circle, etc.). The term "variable" is used is used similarly to the computing sense—for example a dimension in a model could have an unknown value represented by a variable, a solution for the model would yield a value for the variable. The term "set" refers to a collection of geometries that are rigidly connected by either constraints or some other mechanism. A "constraint" refers to an enforced relationship between two geometries (e.g. parallel, concentric, identical, coincident, etc.). "Constraint Balance" refers to the number of degrees of freedom in a model, or a sub-set of a model, minus the number of freedoms removed by constraints. A Constrained Geometry Solver is referred to as "CGS"; such a solver can determine, for example, a method for computing each geometry position based on its current position, the constraints upon it, and the positions of its supports. The solver can also determine whether a geometry is under-defined or well-defined by its constraints and supports (this information is referred to as the "status" of the geometry). A "support" refers to geometry from which others are computed. A "dimension" refers to a constraint with an associated value (e.g. distance, radius, angle, etc.). A "freedom" refers to a way in which a geometry can change (e.g., in two dimensions, a circle has two position freedoms and one radius freedom). "Singular" is used herein to describe a set of values at which geometry status changes (e.g. from well-defined to under-defined) with a given set of constraints to its supports.

"Under-defined" refers to a geometry, set, or variable that has some freedom to change. "Well-defined" refers to a geometry, set, or variable that is fixed; that is, the geometry, set, or variable has no freedoms as each attribute has a given value or has all of its freedoms removed by constraints (including dimensions) to other well-defined geometries. "Under-defined Due to Singular" (UDS) refers to a geometry or set that is under-defined yet has a zero constraint balance with respect to its supports and should therefore generally be well-defined by the constraints (including dimensions) to its supports. Computed From Singular (CFS) refers to a geometry, set, or variable that has been computed (directly or indirectly) from a UDS support.

FIG. 1 depicts a block diagram of a data processing system in which an embodiment can be implemented, for example as a CAD system configured to perform processes as described herein. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EE-PROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100.

A two-dimensional (2D) CGS system calculates the positions of geometries in two dimensions based on a scheme of applied constraints (e.g. parallel—one line parallel to another) and dimensions (a constraint with an associated value—e.g. two points a given distance apart). A geometry may be under-defined, if for example the constraint scheme is insufficient to fully define the freedoms of the geometry with respect to some fixed reference(s), or well-defined, if the constraint scheme is sufficient to remove all of the freedoms, A geometry may also be over-defined if the constraints upon it attempt to remove too many freedoms, or the same freedom more than once.

The constraint balance of a model (or model sub-set) is the number of freedoms in the model (or sub-set) minus the number of freedoms removed by constraints. If the constraint balance is zero then it is expected that all of the geometries in the model would be well-defined (assuming that none of them is over-defined).

In some end-user CAD systems, an error is produced where the constraint balance is zero, yet one or more geometries in the model are actually under-defined. This can occur when the constraint scheme is such that two or more constraints are actually removing the same freedom due to a singular combination of dimension values or geometry shape within the model. The problem can also occur locally, where it is expected that a geometry should be well-defined by the constraints upon it, but it is not due to a singular combination of those constraints. Adding further constraints to the model in these cases will over-define the model rather than having the desired effect of making it well-defined.

A simple example in two dimensions is the case of a line coincident to two points. A line has two freedoms. Making a line coincident to a well-defined point (the line being constrained such that it always passes through that point) removes one freedom from the line. Making that line coincident to a second well-defined point should remove the second of the line's freedoms, making the line well-defined.

However, if the two points are actually at the same position, but not logically identical (which would reduce to a line to one point model), then the point-line coincident constraints are removing the same freedom from the line and the line, despite having two constraints on it, is under-defined, referred to herein as "under-defined due to singular" or UDS. The two points could be at the same position, but not logically identical, by having an identical pair of distance dimensions on them from fixed, orthogonal, reference axes.

A simple example, not requiring dimensions, could be a point constrained to be coincident to two user-defined curves. The curves have a common shape for only a portion of their length and are overlying in this region. The curves are also well-defined. A point coincident to both curves in the overlying region would be under-defined, yet should according to its local constraint balance should be well-defined. This point is UDS.

Various embodiments disclosed herein include a system that processes a geometry or set that is under-defined due to a singular configuration of its supports and determines which of the geometries or sets, if any, in a given model are UDS. The CGS determines which geometries or sets are well-defined and which are under-defined. Using the processes described herein, all under-defined geometries (including set members) can be treated as possible UDS geometries.

To determine whether or not a geometry or set is UDS, its supports are found. Supports are geometries from which a geometry or set is computed, and can be determined by the constraints and geometries in the model, as well as the order in which the model is solved For example, consider a two dimensional model that consists of two non-parallel, fixed lines and a point that is coincident to both lines. The computed point position will be at the intersection of the lines and the lines are the supports of the point. If a support is well-defined, then a constraint from it to the computed geometry or set will remove a freedom or freedoms from that geometry or set. If the number of constraints from well-defined supports should be sufficient to remove all of the freedoms from a geometry or set, yet that geometry or set has been previously determined to be under-defined, then that geometry or set is determined by the system to be UDS—no further checking is required.

Figure 2A:
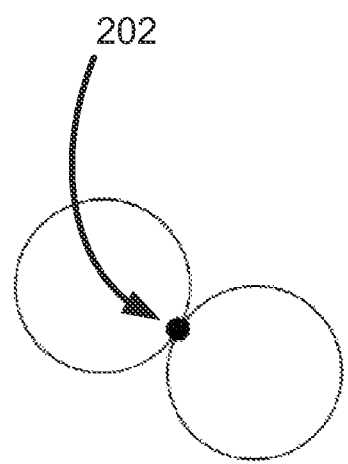
FIGS. 2A-2C show examples using a point coincident to two circles case.
Figure 2B:
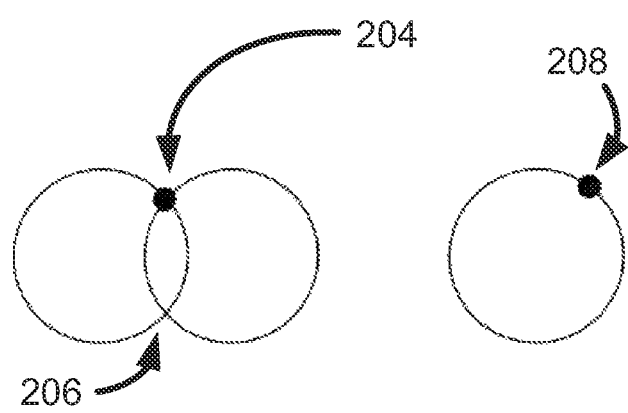
Figure 2C:
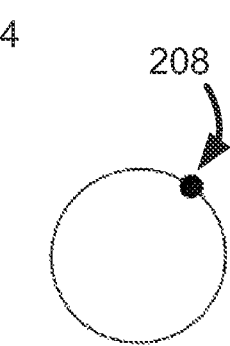

FIGS. 2A-2C show examples using a point coincident to two circles case.

In each case, both of the circles are well-defined and have the same radius, FIG. 2A shows a "tangent circles" case. In such a case, the circles are known to be tangent to each other, so the one point of intersection is well-defined 202. There is only One solution for point 202.

FIG. 2B illustrates an "intersecting circles" case. In such a case, there are two possible solutions where the circles intersect, at point 204 and intersection 206, so each of the points are well-defined.

FIG. 2C illustrates an "overlapping circles" case. The two circles are not logically identical, but through a combination of constraints have become overlapping. In such a case, unlike the previous examples, there are an infinite number of places where the circles intersect, so the point coincident to both circles is UDS. Any single point 208 on the circle cannot be identified using simple constraints that identify the point as a point common to the two circles.

In some embodiments, the system receives a CAD model, and analyzes at least one geometry of the model. The system determines which geometries are under-defined and can determine those which are well-defined. The system determines which geometries or sets have a number of constraints to well-defined supports that are equal to the number of constraints that should be sufficient to make those geometries or sets well-defined. The system identifies and stores an indication of which geometries or sets are UDS by having sufficient constraints but still being under-defined.

Figure 3:
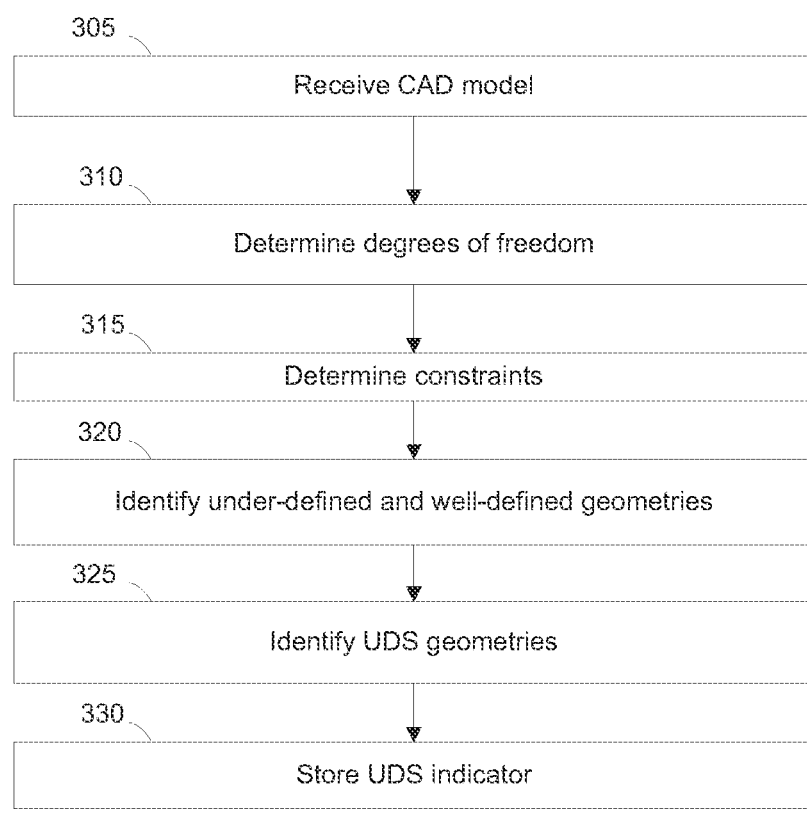
FIG. 3 depicts a flowchart of a process in accordance with disclosed embodiments.

FIG. 3 depicts a flowchart of a process in accordance with disclosed embodiments performed by a data processing system, and in particular can be performed by a data processing system 100 configured to perform processes as described herein, in particular embodiments, the data processing system can be a CAD or PLM system.

The system receives a CAD model that has a plurality of geometries (step 305). Each geometry can include faces, edges, blends, points, or other features. The CAD model can be two-dimensional, three-dimensional, or of a greater number of dimensions, and each of the geometries can likewise be formed in an appropriate number of dimensions. The geometries can include sets of geometries, such as collections of geometries rigidly connected by dimensions or constraints, and this step can include identifying any such sets. The acts and processes described herein can be performed on sets, and any of the geometries of the sets, in addition to or instead of being performed on individual geometries.

Receiving, as used herein, can include loading from storage, receiving from another system, receiving from another process on the same system, or receiving, creating, or editing via an interaction with a user.

The system determines the number of degrees of freedom for each of the geometries and any identified sets (step 310). As described above, each type of geometry has an associated number of degrees of freedom, as does each set.

The system identifies the constraints that will be used to determine geometry position for each of the geometries or sets (step 315). As described herein, a constraint can be a dimensional relationship to a support.

The system identifies each of the geometries or sets that is under-defined (step 320). As described herein, an under-defined geometry or set is one having an unconstrained freedom or freedoms. As part of this step, the system also identifies each of the geometries that is well defined.

The system identifies any of the under-defined geometries or sets as undefined due to singular (UDS) (step 325). A geometry or set is so identified when the geometry or set is under-defined but has well-defined supports and a number of constraints equal to its degrees of freedom so that it has a zero constraint balance.

The system stores a UDS indicator for each of the geometries (including sets) identified as UDS (step 330). By identifying UDS geometries, the system provides a technical advantage in allowing the system and user to avoid otherwise unexplained errors caused by under-defined geometries that already have a zero constraint balance.

Various embodiments allow any UDS geometries to be identified and marked as such by the system. All geometries, sets, or variables that have a UDS geometry as a support may also be stored with a special indication of "computed from singular" CFS. Geometries, sets, or variables that have a CFS geometry as a support may also be marked as CFS as these are indirectly computed from UDS geometries. Disclosed embodiments reduce the number of incidents where models that should have only fully-defined geometries and variables are still determined to have under-defined geometries or variables.

According to various embodiments, the process that determines UDS geometries or sets by constraint counting is in most instances the best solution to the problem. Other embodiments include constructing a derivative matrix for the constraints to a geometry or region of a model—the rank of that matrix then indicates whether the constraints are well-defining (full rank) or singular (reduced rank). A small perturbation of the dimension values and re-doing the rank would then indicate whether the model is over-defined (rank still reduced) or UDS (now full rank).

The various steps of the processes described above may be performed repeatedly, sequentially, concurrently, or in a different order, and in various embodiments, steps can be omitted or combined with other processes.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 100 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of a instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A method performed by a hardware data processing system that includes at least one processor and a memory, comprising:
    receiving a CAD model having a plurality of geometries by the data processing system;
    determining a number of degrees of freedom for each of the geometries by the data processing system;
    determining a plurality of constraints used to position each of the geometries by the data processing system;
    determining the total number of freedoms removed by the constraints by the data processing system;
    identifying any of the geometries that are under-defined and any of the geometries that are well-defined by the data processing system;
    identifying any of the under-defined geometries that are under-defined due to singular (UDS) by the data processing system;
    identifying at least one geometry in the CAD model that is computed from a UDS geometry; and
    storing a UDS indicator for each of the geometries identified as UDS in the data processing system, and storing a computed from singular (CFS) indicator associated with the at least one identified geometry that is computed from a UDS geometry.

2. The method of claim 1, wherein receiving the CAD model includes identifying at least one set of geometries, and each of the other steps is also performed on the set of geometries.

3. The method of claim 1, wherein the CAD model is three-dimensional.

4. The method of claim 1, wherein an under-defined geometry is identified as UDS when it is under-defined but has a number of constraints equal to its degrees of freedom.

5. The method of claim 1, further comprising identifying and storing a CFS indicator associated with any geometry that has is computed from at least one geometry that is identified as CFS.

6. A CAD data processing system, comprising:
    a processor; and
    an accessible memory, the CAD data processing system configured to perform the steps of
    receiving a CAD model having a plurality of geometries;
    determining a number of degrees of freedom for each of the geometries;
    determining a plurality of constraints used to position each of the geometries;
    determining the total number of freedoms removed by the constraints;
    identifying any of the geometries that are under-defined and any of the geometries that are well-defined;
    identifying any of the under-defined geometries that are under-defined due to singular (UDS);
    identifying at least one geometry in the CAD model that is computed from a UDS geometry; and
    storing a UDS indicator for each of the geometries identified as UDS, and storing a computed from singular (CFS) indicator associated with the at least one identified geometry that is computed from a UDS geometry.

7. The CAD data processing system of claim 6, wherein receiving the CAD model includes identifying at least one set of geometries, and each of the other steps is also performed on the set of geometries.

8. The CAD data processing system of claim 6, wherein the CAD model is three-dimensional.

9. The CAD data processing system of claim 6, wherein an under-defined geometry is identified as UDS when it is under-defined but has a number of constraints equal to its degrees of freedom.

10. The CAD data processing system of claim 6, further configured to perform the step of identifying and storing a CFS indicator associated with any geometry that has is computed from at least one geometry that is identified as CFS.

11. A non-transitory computer-readable medium encoded with instructions that, when executed, cause a CAD data processing system to perform the steps of:
    receiving a CAD model having a plurality of geometries;
    determining a number of degrees of freedom for each of the geometries;
    determining a plurality of constraints used to position each of the geometries;
    determining the total number of freedoms removed by the constraints;
    identifying any of the geometries that are under-defined and any of the geometries that are well-defined;
    identifying any of the under-defined geometries that are under-defined due to singular (UDS);
    identifying at least one geometry in the CAD model that is computed from a UDS geometry; and
    storing a UDS indicator for each of the geometries identified as UDS, and storing a computed from singular (CFS) indicator associated with the at least one identified geometry that is computed from a UDS geometry.

12. The computer-readable medium of claim 11, wherein receiving the CAD model includes identifying at least one set of geometries, and each of the other steps is also performed on the set of geometries.

13. The computer-readable medium of claim 11, wherein the CAD model is three-dimensional.

14. The computer-readable medium of claim 11, wherein an under-defined geometry is identified as UDS when it is under-defined but has a number of constraints equal to its degrees of freedom.

15. The computer-readable medium of claim 11, further comprising instructions to cause the CAD data processing system to perform the step of identifying and storing a CFS indicator associated with any geometry that has is computed from at least one geometry that is identified as CFS.

* * * * *